United States Patent [19]
Harris

[11] Patent Number: 5,240,285
[45] Date of Patent: Aug. 31, 1993

[54] AID FOR TRANSPORTING LONG THINGS

[76] Inventor: Douglas S. Harris, Apt. 4-7, Box 128, Scarborough, N.Y. 10510

[21] Appl. No.: 812,157

[22] Filed: Dec. 23, 1991

[51] Int. Cl.⁵ .............................................. A63C 11/02
[52] U.S. Cl. ................................. 280/814; 280/47.131
[58] Field of Search ................. 280/814, 47.131, 79.7, 280/8

[56] References Cited
U.S. PATENT DOCUMENTS

| | | | |
|---|---|---|---|
| 4,114,915 | 9/1978 | Lello et al. | 280/814 |
| 4,500,102 | 2/1985 | Haury | 280/304.1 |
| 4,533,151 | 8/1985 | Maitland | 280/8 |
| 4,540,198 | 9/1985 | Kyburz | 280/814 |
| 4,666,184 | 5/1987 | Garvey | 280/814 |
| 4,842,289 | 6/1989 | Samuels | 280/814 |
| 4,856,811 | 8/1989 | Bressler et al. | 280/814 |

FOREIGN PATENT DOCUMENTS

| | | | |
|---|---|---|---|
| 3437305 | 5/1985 | Fed. Rep. of Germany | 280/814 |
| 2471796 | 6/1981 | France | 280/814 |
| 8001761 | 9/1980 | World Int. Prop. O. | 280/814 |
| 8404890 | 12/1984 | World Int. Prop. O. | 280/814 |

Primary Examiner—David M. Mitchell

[57] ABSTRACT

A housing is attached to the lower end of the long item being transported. This housing allows the long item to be pulled by a person or machine without damage to the lower, trailing end of the item at which the housing is attached. In one embodiment, the housing is equipped with a wheel or wheels so that it may roll within minimal frictional resistance while the long item is being transported. In a second embodiment, the housing is shaped like a ski, or equipped with a ski or skis so that it may slide easily over surfaces that a wheel cannot roll over with minimal frictional resistance. In a third embodiment, both the ski shape, and the wheeled design are combined to create a device that can easily traverse any surface.

4 Claims, 5 Drawing Sheets

AID FOR TRANSPORTING LONG THINGS

The present invention relates to the transport of long items. Said invention consists of an attachment to the lower, trailing end of the long item being transported. Design of the invention is such that the transported item can be moved without damage from contact with the surface upon which it moves. Also, the invention minimizes frictional resistance to motion between the item being moved and the surface upon which it moves.

Conventionally, long items must be carried to prevent damage which could result from the item scraping on the surface over which the item is being transported. For long items, this is a difficult and clumsy endeavor. For items transported manually, costly accidents are likely. Also, to minimize the risk of accidents, two, or more people are conventionally employed to transport the item. At least one person at each end is required; and, possibly, additional people in between are needed. Such an operation is costly in terms of man hours, and extends more energy than would be expended with the use of this invention. The work required to lift and transport a long item is much more than the work required to drag it if the lower, dragging end of the long item is of a design that reduces frictional resistance to motion, as is described in this disclosure. In the event that two long items must be transported, an even clumsier process ensues when attempted by a single person. The two items, if carried in the arms, or over one's shoulder, tend to not stay parallel and aligned with each other, thus causing a "scissoring" action. This deleterious motion causes damage to the two items as a result of rubbing and scraping. It also becomes very dangerous to the people nearby because the ends of the long items are out of control. Furthermore, if the long items are dirty, carrying the items by hand or over the shoulder results in transfer of dirt from the items to the clothing of the person doing the transporting. An additional problem with the transporting of long items without this invention is the fact that the parts of the body used to carry the long items could be better utilized to do other things. For instance, if the long items are carried in two hands, then the hands are occupied and not available to carry other things. Similarly, if the long item or items are carried over the shoulder, the shoulder is not available to carry other things. Furthermore, with the use of this invention, labor and energy can be saved transporting other things in addition to the long items. These additional things can be attached to the long items so that they too can be, in effect, dragged instead of carried. Thus, with the use of this invention, the transport of additional things requires no additional resources in terms of shoulders or arms. Additionally, energy is saved carrying these additional things because, as with the long items, during the transporting process, part of the weight of the transported items is supported by the invention and not by the person or machine doing the transporting.

Overcoming the difficulties and deleterious effects described above, the present invention is designed to eliminate these troublesome problems by offering a simple-construction, efficient, durable, and practicable device for transporting long items. The invention is provided with a housing which attaches to the bottom, trailing end of the long items and also protects the lower edge of the items from damage as a result of contact with the surface over which the item is being transported. The attachment of the housing is further aided by the inclusion in the invention of an elastic cord, or inelastic rope, which is attached at one end to the axle inside the housing. The other end of the elastic cord is fastened into a loop and can be attached to some feature on the long item to retain the long item into the housing. In the embodiment of the invention using a rope, one end of the rope is permanently attached to the axle inside the housing, while the other end can be attached to the long item, or threaded through or around any feature that might exist on the long item and then held fast by locking the remaining free end of the rope under a jam cleat which is part of the invention attached to the housing. The jam cleat is a tapered, wedge shaped slot, open at the wide end to allow insertion of the rope. As the rope is slid towards the narrow end of the slot it becomes wedged and locked in place. Further tension applied to the rope only helps to lock the rope more securely.

Furthermore, the invention is provided with a means of traversing the surface over which the item is being transported with minimal friction. In one embodiment, the means is accomplished by providing the invention with wheels and an axle that will allow the invention to roll over the surface over which the item is being transported. In another embodiment, the invention is provided with skis or a ski-shaped surface on the bottom which would allow the invention to easily be moved over soft surfaces, such as snow. In yet another embodiment, both the wheels and the ski feature are combined to allow for the easy transport over any surface which may be encountered. In either of the above embodiments incorporating a wheeled construction, the wheel tread is provided so as to have good traction in soft snow. In other words, the wheel tread is of a heavy duty design, as might be found on a motorcycle tire, so that the irregularities in the tread surface will cause the invention to climb up over piles of snow instead of trying to plow through the snow. Furthermore, the construction of the wheel is of a blow-molded plastic design to provide the wheel and tread function at minimum weight and cost.

The housing of the invention is provided with a closed bottom design, so that any irregularities, such as rocks or steps, which are encountered during the transport process, come in contact with the protective housing and not the long item being transported. This feature further prevents damage to the long items. Similarly, the housing is provided with a closed top to provide the same protection to the long items even if the invention is used upside down.

The invention is further provided with the appropriate materials of construction so as to be resistant to mechanical damage, especially when at low ambient temperatures. Since it is expected that this invention will be used outdoors during the Winter, but may also be exposed to temperatures of the hottest Summer days, the materials of construction are selected to be rugged and damage resistant at temperatures down to $-30$ Fahrenheit and up to 120 Fahrenheit. This requirement makes the choice of PVC or a plastic material with similar mechanical properties a good choice for the housing material.

The invention is further provided with an axle which serves a triple purpose. The primary purpose of the axle is to provide mounting posts for the wheels as would be conventional. The secondary purpose of the axle is accomplished by clever selection of the axle location.

The axle is located at the trailing end of the invention approximately half way up the height of the housing. By locating the axle in this vertical and horizontal location, it can and does also act as a stop for any item inserted in the housing and being transported by the invention. The function as a stop is further enhanced by the incorporation of a coating around the axle that provides a non-marring contact with the long items being transported. The tertiary function of the axle is to provide a shape around which the aforementioned rope or elastic cord can be fastened. This triple usage of the axle provides features to the invention without adding additional cost for a separate stop or attachment fitting.

The invention is provided with a housing of an optimal length to provide sufficient protection to the underside of the long items being carried, while being short enough to be conveniently stored or carried when not in use. An additional consideration in determining optimal length comes into consideration when the invention is provided with the elastic cord. The housing must be long enough so that, if the invention, while in normal use, comes upon a sizable obstacle; the invention will not slide off the end of the long item. This optimization applies to both the length of the elastic cord, the elasticity of the elastic cord, and the length of the housing.

The invention is further provided with a choice of colors. Some colors provide the function of being aesthetically compatible with the color or colors of the long items being carried. Other colors provide the function of being brightly visible from long distances, thereby making the invention easy to find when stored in a large crowded place. The choice of colors also simply makes it possible for the user to have an invention in the color that the user finds pleasing.

Additionally, the invention is further provided with axle caps which provide four purpose. Firstly, they retain the wheels onto the axle. Secondly, they are sized, in combination with the length of the axle to provide just enough axial dimensional clearance along the axle to allow the wheels to rotate freely. Thirdly, they are of a closed end design so that a separate locking means need not be provided to retain the caps on the axle All that need be done during assembly of the invention is to attach the cap with sufficient force so that the end of the axle is mechanically jammed up against the inside of the axle cap used for this function This jamming is sufficient to hold the cap in place. Such a design saves cost. The fourth function of the axle cap is to provide a decorative and aesthetically pleasing cover for the end of the axle. For this function, plated axle caps are the best. As a feature to save cost, axle caps of the sheet metal design variety are optimal.

The invention is also provided with a housing of a shape such that, in the wheeled version, the housing extends rearward beyond the wheels just slightly and only at elevations near the midpoint of the housing height. This gives the invention the ability to be used as a protective footing and be stood up vertically while the long items are leaned against any building or structure in a vertical or near vertical orientation. The protruding extension prevents the wheel feature from contacting the surface in this orientation, thus preventing the invention from rolling away from the building or structure against which the items are leaning.

Lastly, the housing is provided with an open back end to allow the locking of the entire invention to any available post or structure by using a commonly available cable-type lock. The open end also allows for drainage of water or other liquids off of the long items if they are wet while they are being transported in the invention. The same open end feature is applied to the additional add-on housing The principal object of the invention is to provide an attachment to the end of long items being transported which contains a means of traversing the surface with low friction and a means for attachment to the long items being transported so that the long items can be transported with less energy than carrying in a conventional manner by allowing the user to drag, with low friction, the trailing end of the long items instead of carrying the entire weight of the long items and so that the long items can be transported with minimal physical contact between the transporter and the items thus minimizing the potential for damage as a result of contact to either the transporter or the long items.

A further object of the invention is to provide a ski-like shape to the underside of the invention thus allowing the movement of the trailing end of the long items over soft surfaces, such as snow or mud, with minimal friction.

A further object of the invention is to provide a combination of wheels and a ski-like shape to the lower end of the invention that will allow the movement of the trailing end of the long items over the surface regardless of the consistency of the surface, soft or hard with minimal friction Another object of the invention is to provide the invention with a durable housing that protects the long items from damage during transport.

A further object of the invention is to provide a housing of size and shape appropriately sized for the shape of the long items being transported so that when 2 or more long items are being transported at once, the long items do not rub unacceptably on each other causing damage to each other.

A still further object of the invention is to use materials and parts of the lowest possible cost without sacrificing acceptable durability levels, thus providing the lowest possible cost product to the user.

A further object of the invention is to make the housing of such a design so as to allow for the attachment of additional housings to carry additional long items with minimal additional effort or cost.

Another object of the invention is to use materials and parts of the lightest possible weight without sacrificing acceptable durability levels, thus providing the lowest possible weight product to the user.

Yet another object of the design is to provide the invention with a shape allowing the use of a cable type lock in securing the invention to a conveniently located fence or rack or some such structure when the invention is not in use.

Still another object of the invention is to provide a way of transporting long items so that they can be used, while being transported, as a cart or carrier to transport other things simultaneously, with greater ease.

Another object of the invention is to provide a cord or rope which serves to attach the invention to the end of the long item or items by being permanently attached to the invention and temporarily attached to the long item or items.

Another object of the invention is to provide wheel tread of a coarse design so that the tread gives the wheel a tendency to ride up and over the top of soft snow-like terrain.

Yet another object of the invention is to provide a housing with a closed bottom design, so that any irregularities, such as rocks or steps, which are encountered during the transport process, come in contact with the protective housing and not the long item being transported. This feature further prevents damage to the long items. Similarly, the housing is provided with a closed top to provide the same protection to the long items even if the invention is used upside down.

Another object of the invention is to use materials and parts that can withstand temperature extremes that may be found on the planet Earth. This will allow for the invention to be durable and long-lasting in all possible environments.

Another object of the invention is to provide an axle location for the wheels which can serve 3 purposes simultaneously, namely that of a wheel support, that of an end stop for the long items, and that of a fitting about which to attach the permanently attached end of the aforementioned cord.

Another object of the invention is to provide a coating around the axle that provides a non-marring contact with, the long item being transported, thus preventing any possible damage to the long item.

Yet another object of the invention is to provide the opening of the housing into which the long items are places with a chamfer or bevel so that no possible damage to the long items can result from contact between the housing and the long items during attachment, transport, or removal.

Another object of the invention is to use materials and parts that are softer in surface hardness than the typical items being transported so that no possible damage can result to the long items from contact with the housing.

Another object of the invention is to provide a housing of optimal length so as to provide sufficient protection to the long items from damaging objects that may be encountered and also long enough so that the housing will not come off if attached with an elastic cord to the long items, but short enough to be conveniently stored or carried or locked up when not in use.

Another object of the invention is to provide the invention in a choice of colors, some colors being aesthetically compatible with the color or colors of the long items being transported, other colors being brightly visible from long distances, thus making the invention easy to find when lost or stored in a large, and/or crowded place, and still other colors so that the user may have a device that is aesthetically pleasing to the user.

Still another object of the invention is to provide the optimal design and selection of devices to retain the wheels on the axles, namely plated sheet metal acorn axle caps, so that they can be secured by tightening without a separate locking mechanism, provide a decorative end closure for the axle and retain the wheels at minimal cost while providing the other two functions.

Another object of the design is to provide an axle of optimal design to meet the needs of low cost and adequate function, namely a rod of either a corrosion resistant material or coated or plated with a corrosion resistant coating, whichever is more readily available in the marketplace at the time of purchase Another object of the design is to provide an axle and wheel mounting angle so that the wheels are tilted to be further apart at the bottom than at the top. This angled wheel design provides more stability to the invention and reduces the tendency for the invention to tip over while in use.

Yet another object of the invention is to provide a means of attachment and retention to the ends of the long items so that the long items can be carried in other, more conventional ways without interference from the presence of the invention being attached.

Another object of the invention is to provide the invention with a housing of a shape such that, in the wheeled version, the housing extends rearward beyond the wheels just slightly and only at elevations near the midpoint of the housing height. This gives the invention the ability to be used as a protective footing and be stood up vertically while the long items are leaned against any building or structure in a vertical or near vertical orientation. The protruding extension prevents the wheel feature from contacting the surface in this orientation, thus preventing the invention from rolling away from the building or structure against which the items are leaning.

Another object of the invention is to provide the housing with an open back end to allow the locking of the entire invention to any available post or structure by using a commonly available cable-type lock. The open end also allows for drainage of water or other liquids off of the long items if they are wet while they are being transported in the invention. The same open end feature is applied to the additional add-on housing also.

Other objects and advantages of the invention will become better understood hereinafter from the consideration of the specification with reference to the accompanying drawings forming part thereof, and this invention shall not be limited to the precise arrangement and instrumentalities, and in which like numerals correspond to like parts throughout the several views of the invention, and wherein.

Figure 1:
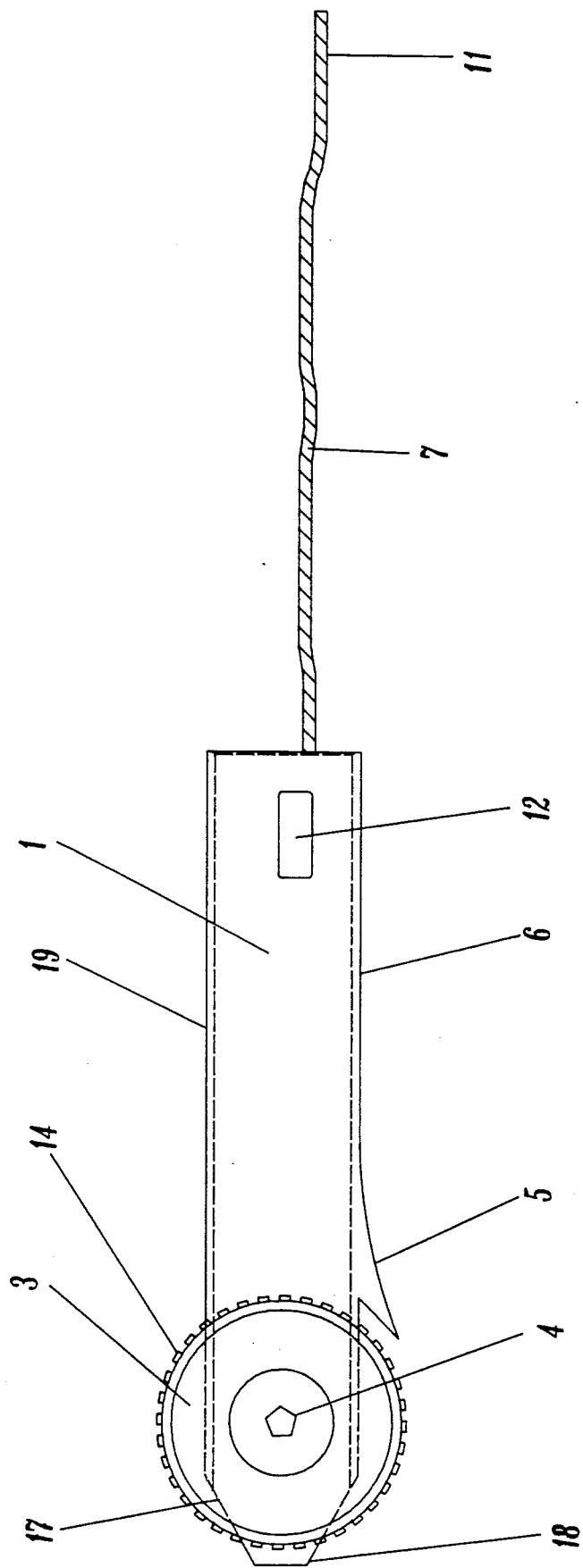
FIG. 1 is a side view of the invention in elevation.
Figure 2:
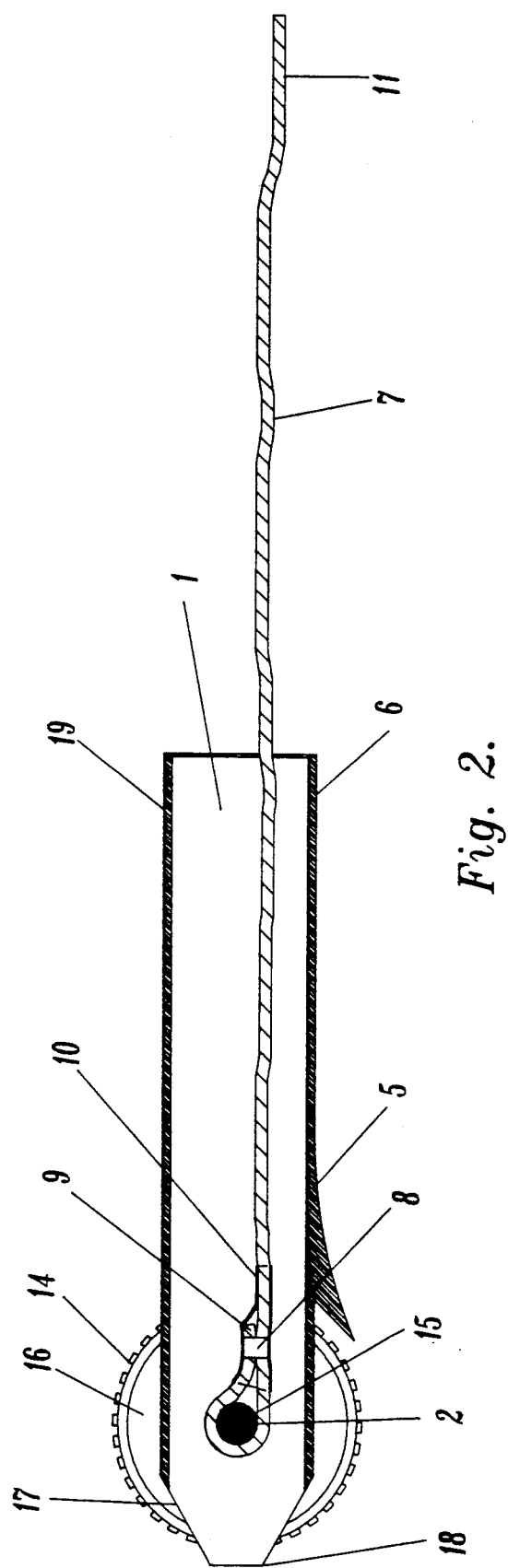
FIG. 2 is a sectional elevation view showing the rope, the axle, and the related parts.
Figure 3:
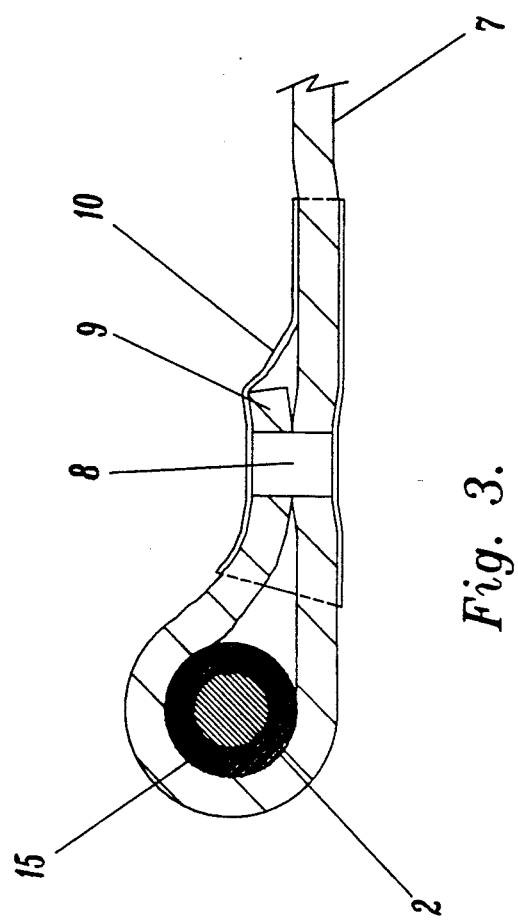
FIG. 3 is a detailed view of a portion of FIG. 2 but on a larger scale to show the axle and rope and their means of attachment.
Figure 4:
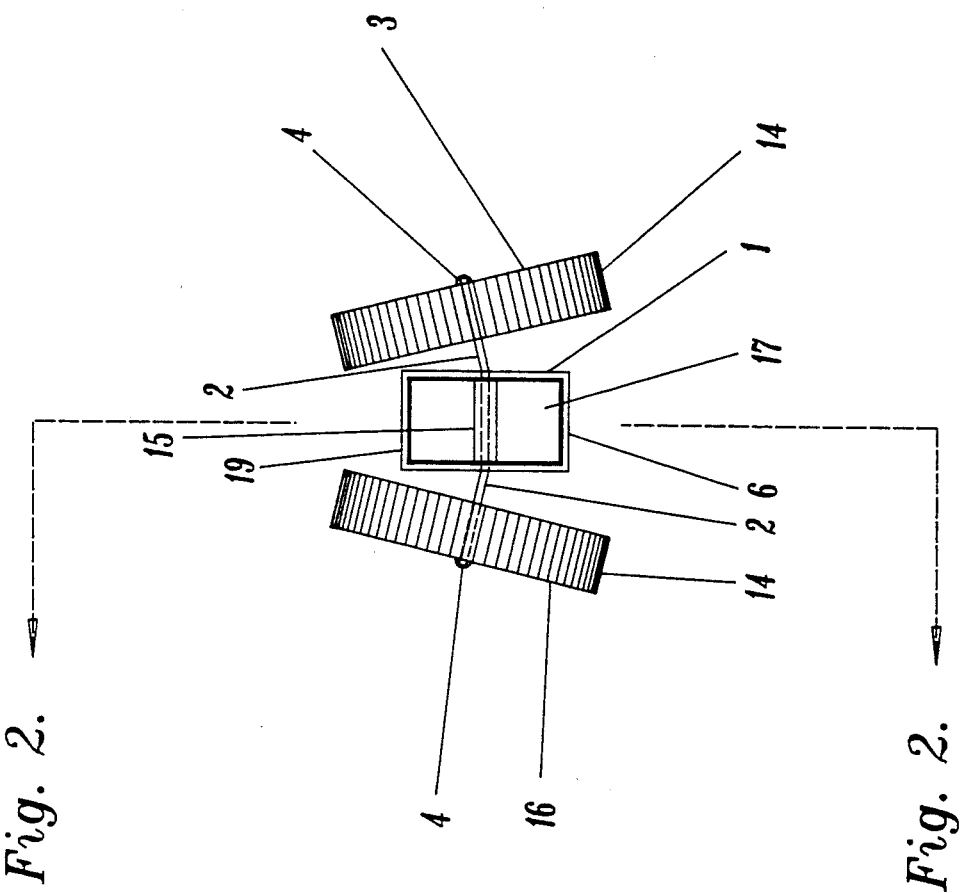
FIG. 4 is an end view elevation of the invention.
Figure 5:
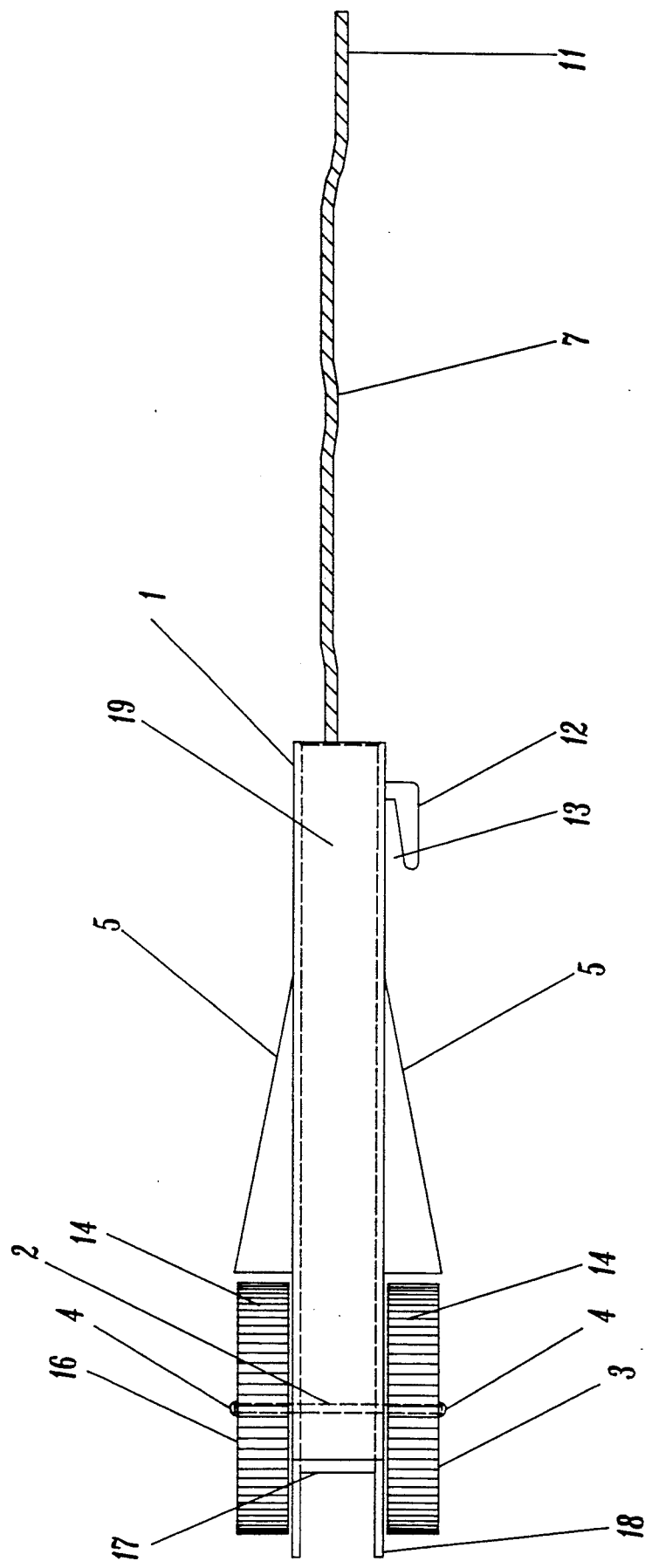
FIG. 5 is a top view of the invention.

Referring to the drawing, the aid for transporting long things characterizing the present invention comprises a housing 1 for holding the ends of long items and having an axle 2 supporting wheels 3 and 16 and retained by press-on type acorn axle caps 4. A ski-shaped bottom 5 is incorporated into the housing 1 to provide smooth and easy motion over soft and/or irregular surfaces with minimal friction. The housing 1 which attaches to the bottom, trailing end of the long items being transported also protects the lower edge of the items from damage as a result of contact with the surface over which the item is being transported by having a closed bottom 6. The attachment of the housing 1 ; to the long items is aided by the inclusion in the invention of an elastic cord (not shown), or inelastic rope 7, which is attached at one end permanently to the axle 2 The means of permanent attachment is accomplished by the use of a crimpable collar 8 which is crimped tightly around the rope 7 and the free end of the rope 9 after the rope 7 is wrapped around the axle 2. The crimp collar 8 is then covered with heat shrinkable tubing 10 to prevent the crimp collar 8 from scratching the long items being transported. The heat shrinkable tubing 10 is shrunk in place to prevent its movement out of position along the rope 9. Alternatively, the rope 9 could be fastened to the axle 9 by simply making a knot around the axle 2. In the embodiment of the invention using an elastic cord instead of a rope 9, the free end of the elastic cord is fastened into a loop and can be attached to some feature on the long item to retain the long item into the housing. The fastening of the free end of the elastic cord into a loop is accomplished similarly to the means used to attach the rope 7 to itself around the axle 9 as described above. In the embodiment of the invention using a rope 7, one end of the rope is permanently attached to the axle 9 inside the housing 1, while the other end can be attached to the long item, or threaded through or around any feature that might exist on the long item and then held fast by locking the remaining free end of the rope 11 under a jam cleat 12 which is part of the invention attached to the housing 1. The jam cleat 12 is a tapered, wedge shaped slot 13, open at the wide end to allow insertion of the rope 7. As the rope 7 is slid towards the narrow end of the slot 13 it becomes wedged and locked in place. Further tension applied to the rope 7 only helps to lock the rope 7 more securely.

Furthermore, the invention is provided with a means of traversing the surface over which the item is being transported with minimal friction. In one embodiment, the means is accomplished by providing the invention with wheels 3 and 16 and an axle 2 that will allow the invention to roll over the surface over which the item is being transported. In another embodiment, the invention is provided with skis or a ski-shaped surface on the bottom 5 which would allow the invention to easily be moved over soft surfaces, such as snow. In yet another embodiment, both the wheels 3 and 16 and the ski feature 5 are combined to allow for the easy transport over any surface which may be encountered. In either of the above embodiments incorporating a wheeled construction, the wheel tread 14 is provided so as to have good traction in soft snow. In other words, the wheel tread 14 is of a heavy duty design, as might be found on a motorcycle tire, so that the irregularities in the tread surface 14 will cause the invention to climb up over piles of snow instead of trying to plow through the snow. Furthermore, the construction of the wheel 3 and 16 is of a blow-molded plastic design to provide the wheel 3 and 16 and tread 14 function at minimum weight and cost.

The housing 1 of the invention is provided with a closed 2 bottom 6 design, so that any irregularities, such as rocks or steps, which are encountered during the transport process, come in contact with the protective housing 6 and not the long item being transported. This feature further prevents damage to the long items. Similarly, the housing is provided with a closed top 19 to provide the same protection to the long items even if the invention is used upside down. The invention is further provided with the appropriate materials of construction so as to be resistant to mechanical damage, especially when at low ambient temperatures. Since it is expected that this invention will be used outdoors during the Winter, but may also be exposed to temperatures of the hottest Summer days, all the materials of construction are selected to be rugged and damage resistant at temperatures down to −30 Fahrenheit and up to 120 Fahrenheit. This requirement makes the choice of PVC or a plastic material with similar or better mechanical properties a good choice for the housing material.

The invention is further provided with an axle 2 which serves a triple purpose. The primary purpose of the axle 2 is to provide mounting posts for the wheels 3 and 16 as would be conventional. The secondary purpose of the axle 2 is accomplished by clever selection of the axle 2 location. The axle 2 is located at the trailing end of the invention approximately half way up the height of the housing 1. By locating the axle 2 in this vertical and horizontal location, it can and does also act as a stop for any item inserted in the housing 1 and being transported by the invention. The function as a stop is further enhanced by the incorporation of a coating 15 around the axle 2 that provides a non-marring contact with the long items being transported. The tertiary function of the axle 2 is to provide a shape around which the aforementioned rope 7 or elastic cord can be fastened. This triple usage of the axle 2 provides features to the invention without adding additional cost for a separate stop or attachment fitting.

The invention is provided with a housing 1 of an optimal length to provide sufficient protection to the underside of the long items being carried, while being short enough to be conveniently stored or carried when not in use. An additional consideration in determining optimal length comes into consideration when the invention is provided with the elastic cord The housing 1 must be long enough so that, if the invention, while in normal use, comes upon a sizable obstacle; the invention will not slide off the end of the long item. This optimization applies to both the length of the elastic cord, the elasticity of the elastic cord, and the length of the housing 1. The invention is further provided with a choice of colors. Some colors provide the function of being aesthetically compatible with the color or colors of the long items being carried. Other colors provide the function of being brightly visible from long distances, thereby making the invention easy to find when stored in a large crowded place. The choice of colors also simply makes it possible for the user to have an invention in the color that the user finds pleasing.

Additionally, the invention is further provided with axle caps 4 which provide four purpose. Firstly, they retain the wheels 3 and 16 onto the axle 2. Secondly, they are sized, in combination with the length of the axle 2 to provide just enough axial dimensional clearance along the axle 2 to allow the wheels 3 and 16 to rotate freely. Thirdly, they are of a closed end design so that a separate locking means need not be provided to retain the caps 4 on the axle 2. All that need be done during assembly of the invention is to attach the cap 4 with sufficient force so that the end of the axle 2 is mechanically jammed up against the inside of the axle cap 4 used for this function. This jamming is sufficient to hold the cap 4 in place. Such a design saves cost. The fourth function of the axle cap 4 is to provide a decorative and aesthetically pleasing cover for the end of the axle 2. For this function, plated axle caps 4 are the best. As a feature to save cost, axle caps 4 of the sheet metal design variety are optimal.

The invention is also provided with a housing 1 of a shape such that, in the version containing wheels 3 and/or 16, the housing 1 extends rearward beyond the wheels 3 and 16 just slightly and only at elevations near the midpoint of the housing 1 height. This gives the invention the ability to be used as a protective footing and be stood up vertically while the long items are leaned against any building or structure in a vertical or near vertical orientation. The protruding extension 18 prevents the wheel feature 3 and/or 16 from contacting the surface in this orientation, thus preventing the invention from rolling away from the building or structure against which the items are leaning.

Figure 6:
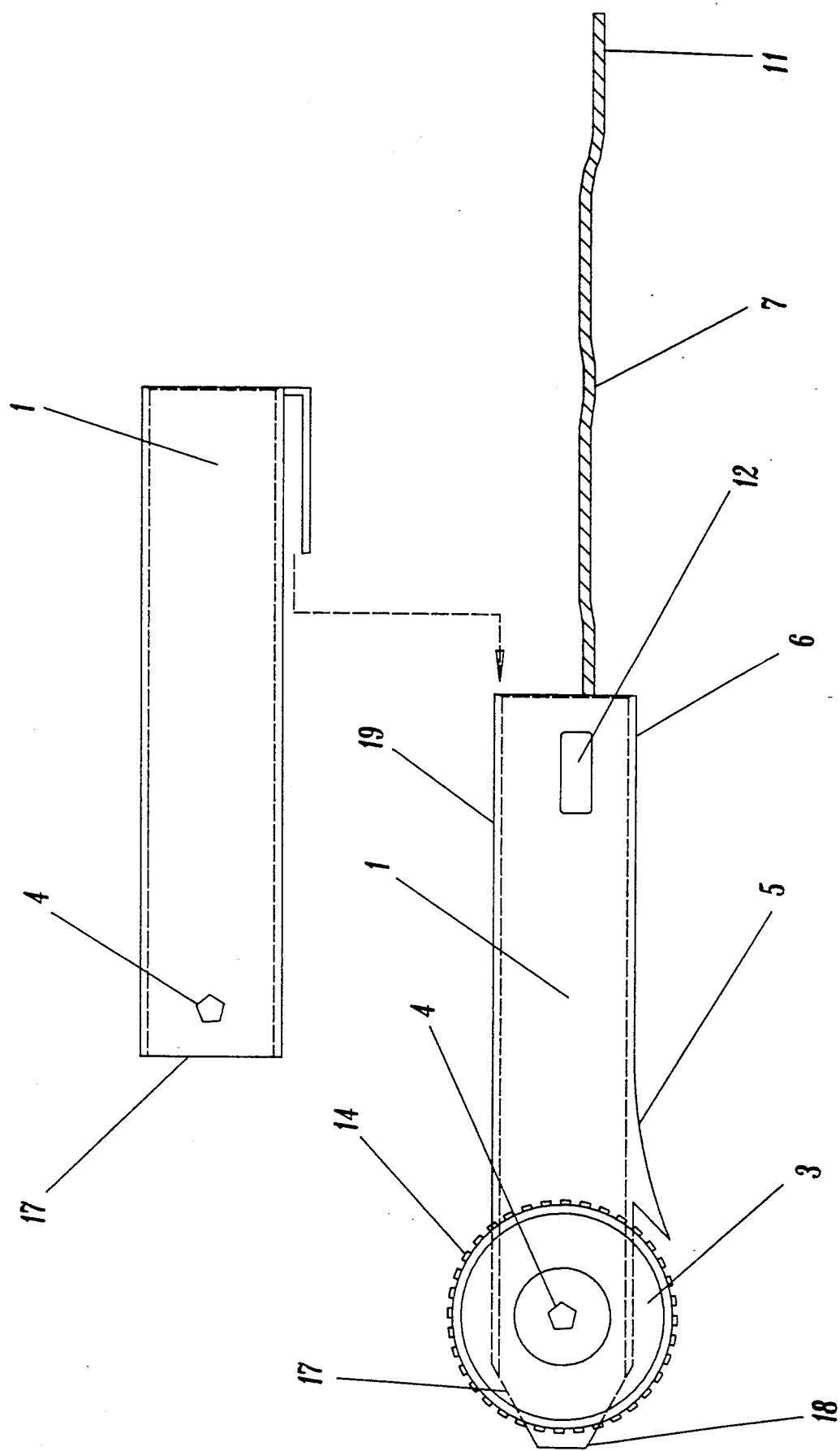
FIG. 6 is a side view in elevation of the invention including an additional housing which can be attached for increased capacity.

Lastly, the housing 1 is provided with an open back end 17 to allow the locking of the entire invention to any available post or structure by using a commonly available cable-type lock. The open end 17 also allows for drainage of water or other liquids off of the long items if they are wet while they are being transported in the invention. The same open end feature 17 is applied to the additional housing 1 shown in FIG. 6.

In operation the long items to be transported are placed end-first into the tubular housing 1. The long items are slid into the housing 1 until they are stopped by contact with the coating 15 around the axle 2. With the long items located suchly inside the protective housing 1 the long items can be transported while supported only at the end of the long items not in the housing 1. To aid in retention of the housing during transport over rough or irregular surfaces the rope 7 or elastic cord is fastened around any available feature on the long items Such attachment prevents the long items from coming out of the housing 1. In the embodiment of the invention incorporating a rope 7, the remaining free end of the rope is secured to the housing 1 by use of the jam cleat 12 which is attached to the housing 1.

It will be appreciated by those skilled in the art that other various modifications could be made to the illustrated and described invention without departing from the spirit and scope of this invention. Having thus described the invention, it is to be understood that certain modifications in the construction and arrangement of the parts thereof will be made, as deemed necessary, without departing from the scope of the appended claims.

I claim

1. A device for transport of items of length comprising a housing; said housing being of rectangular tubular shape with internal dimensions such that the ends of the desired number of long items can be easily inserted in one open end of the tubular housing; a member extending between the walls of said tubular housing near the other end to act as a stop for said long items inserted in said housing; at least one wheel, said housing including means for mounting said wheels to said housing to enable said housing to roll over terrain; said device further comprising an additional housing; said additional housing being of tubular shape with internal dimensions such that the ends of the desired number of long items can be easily inserted in one open end of said additional housing; a member extending between the walls of said additional tubular housing near the other end to act as a stop for long items inserted in said additional housing; a rigid extension of material permanently affixed to the bottom edge of the end opening of said additional tubular housing having received the long items, and said rigid extension of material oriented to be parallel to the bottom wall of said additional housing at spaced relation from said bottom wall at a distance slightly greater than the thickness of the top wall of the initially described tubular housing and of a width such that said extension can be inserted inside an end of the initially described tubular housing so that said additional housing can be attached to the top of the initially described tubular housing by sliding the top edge of the opening of the initially described tubular housing into the slot formed by the space between said additional housing and said extension so that additional long items can be transported on said initially described device.

2. A device for transport of items of length comprising a housing; said housing being of rectangular tubular shape with internal dimensions such that the ends of the desired number of long items can be easily inserted in one open end of the tubular housing; a member extending between the walls of said tubular housing near the other end to act as a stop for said long items inserted in said housing; at least one wheel, said housing including means for mounting said wheels to said housing to enable said housing to roll over terrain; said device including a rope affixed at one end to said device and having lengthwise elasticity, said rope having a free end attached about said long items being carried, the elastic rope providing a continuous force retaining said ends of said long items within said tubular body of said device despite the tendency for said items to slide out of said tubular housing as a result of normal use of said device; said device further comprising an axle extending between the side walls of said tubular housing at one end to act as a stop for long items inserted in the opposite end of the housing, at least one wheel mounted on said axle, and said rope being attached to said axle within the housing.

3. A device as described in claim 2 including a non-marring coating over the portion of said axle that contacts the long items so that the long items will not get damaged from direct contact with said axle.

4. A device for transport of items of length comprising a housing; said housing being of rectangular tubular shape with internal dimensions such that the ends of the desired number of long items can be easily inserted in the open end of the tubular housing, and with sides and top and bottom walls in spaced relation to each other such that minimal excess distance exists between the long items and the inside surfaces of said walls so that long items are prevented from becoming damaged by excessive rubbing contact with the edges of the end of said tubular housing; an axle extending between said side walls at one end to act as a stop for long items inserted in the opposite end of the housing, at least one wheel mounted on said axle, each wheel having a tread of coarse configuration oriented with ridges across the face of the wheel's outer perimeter so that the device can easily ride up over the top of soft snow-like terrain, said axle positioned on said side wall mid-way between the top and bottom walls, thus allowing use of the device upside-down; at least one tapered and sufficiently curved surface on the bottom wall of said housing to contact the ground and enable said device to be moved easily over uneven or soft surfaces; a rope, with lengthwise elasticity, said rope having a free end attached about said long items being carried, the opposite end of said rope being attached to said axle within the housing, the elastic rope providing a continuous force retaining said ends of said long items within said tubular body of said device despite the tendency for said items to slide out of said tubular housing as a result of normal use of said device; means for securing said free end of said rope to said housing after said rope has been routed around a feature on said long items, so that tension in said rope can be maintained; an outside surface treatment to provide a bright and highly visible color so that said device can be located in poor lighting conditions and at great distances and in crowded places as may be necessary after storage of said device when not in use; a non-marring coating over the portion of said axle that contacts said long items so that the long items will not get damaged from direct contact with said axle; said side walls of said housing extending rearward beyond the wheels only at elevations near the midpoint of the height of said housing, thus providing a footing such that the device can be rested in a near vertical orientation while carrying long items and the tips of the long items are rested against a vertical surface such as a wall without the device rolling away from said vertical surface; the lower end of said tubular housing providing an opening so that moisture that may be on said long items my drain off and out the bottom of said housing, and so that a standard cable-type lock can be threaded through the body of said tube longitudinally and then be secured around any available structure to prevent theft of the device when said device is not in use; wherein said long items are supporting structure for the transport of additional items, not necessarily of length, so that said additional items can be transported similarly to said long items with reduced effort.

* * * * *